United States Patent [19]

Riccitiello et al.

[11] Patent Number: 4,713,275
[45] Date of Patent: Dec. 15, 1987

[54] CERAMIC/CERAMIC SHELL TILE THERMAL PROTECTION SYSTEM AND METHOD THEREOF

[75] Inventors: Salvatore R. Riccitiello; Marnell Smith, both of San Jose; Howard E. Goldstein, Saratoga; Norman B. Zimmerman, Los Gatos, all of Calif.

[73] Assignee: The United States of America as represented by the Administrator of the National Aeronautics and Space Administration, Washington, D.C.

[21] Appl. No.: 862,925
[22] Filed: May 14, 1986
[51] Int. Cl.$^4$ .............................................. B32B 1/06
[52] U.S. Cl. ......................................... 428/76; 428/44; 428/74; 428/920; 244/158 A; 244/117 A
[58] Field of Search ........................ 428/44, 49, 74, 76, 428/920; 244/158 A, 117 A

[56] References Cited

U.S. PATENT DOCUMENTS 4,456,208  6/1984  MacConochie et al. ........ 244/158 A

Primary Examiner—Alexander S. Thomas
Attorney, Agent, or Firm—Darrell G. Brekke; John R. Manning

[57] ABSTRACT

The present invention discloses a ceramic reusable externally applied thermal protection system (TPS). The system functions by using the composite device created by combining an upper shell, thermal insulation and lower tile components shown in FIG. 2. The upper shell effectively separates its primary functions as a toughened outer-surface and load carrier. In a preferred embodiment, a structurally strong ceramic/ceramic upper shell is manufactured from ceramic cloth upon which additional ceramic material has been deposited and maintains the configuration of the upper shell. The lower tile is composed of lightweight ceramic normally acceptable in this application. One or more lightweight rigid or flexible insulation materials are used in the cavity created by combining the upper shell and lower tile. The assembly of the overall tile is facilitated by attachment means effective to withstand the temperature and stress conditions. These attachment means include a self-locking wedge and complementary surface, ceramic pins, augers and the like. The device is useful on the interior surface of a kiln or the like and is also attached to the exterior surface of an aerospace vehicle for thermal protection.

22 Claims, 7 Drawing Figures

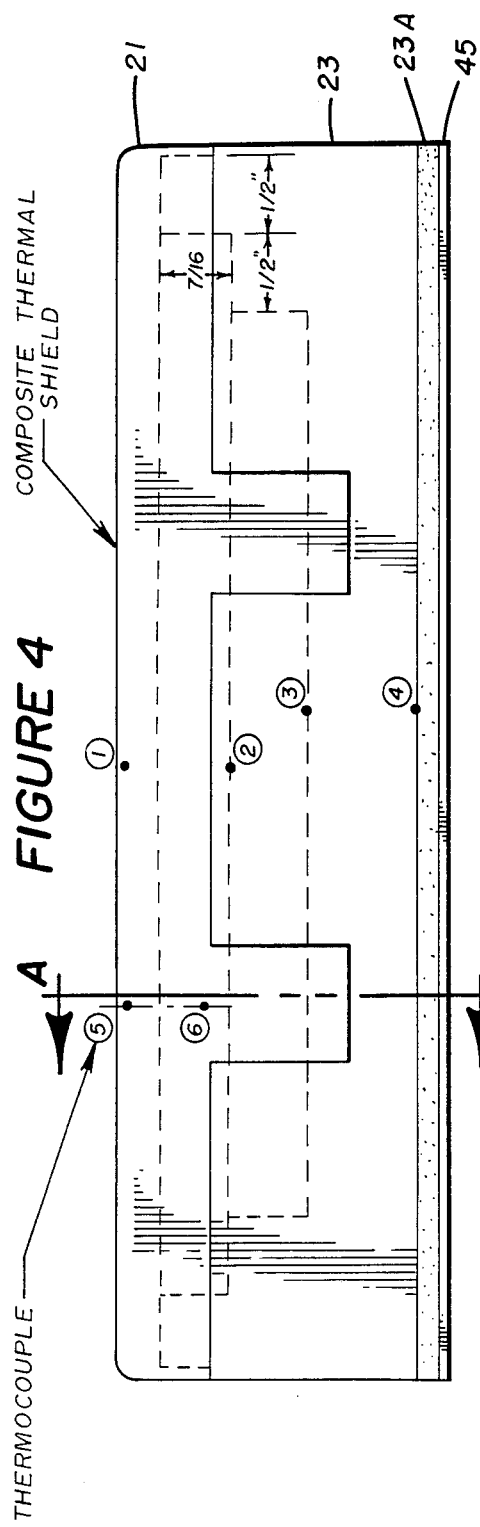
FIGURE 4
FIGURE 5
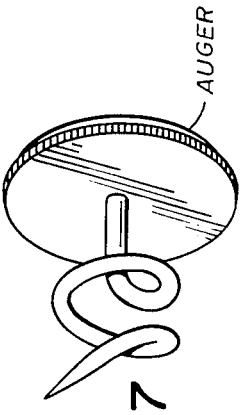
FIGURE 7

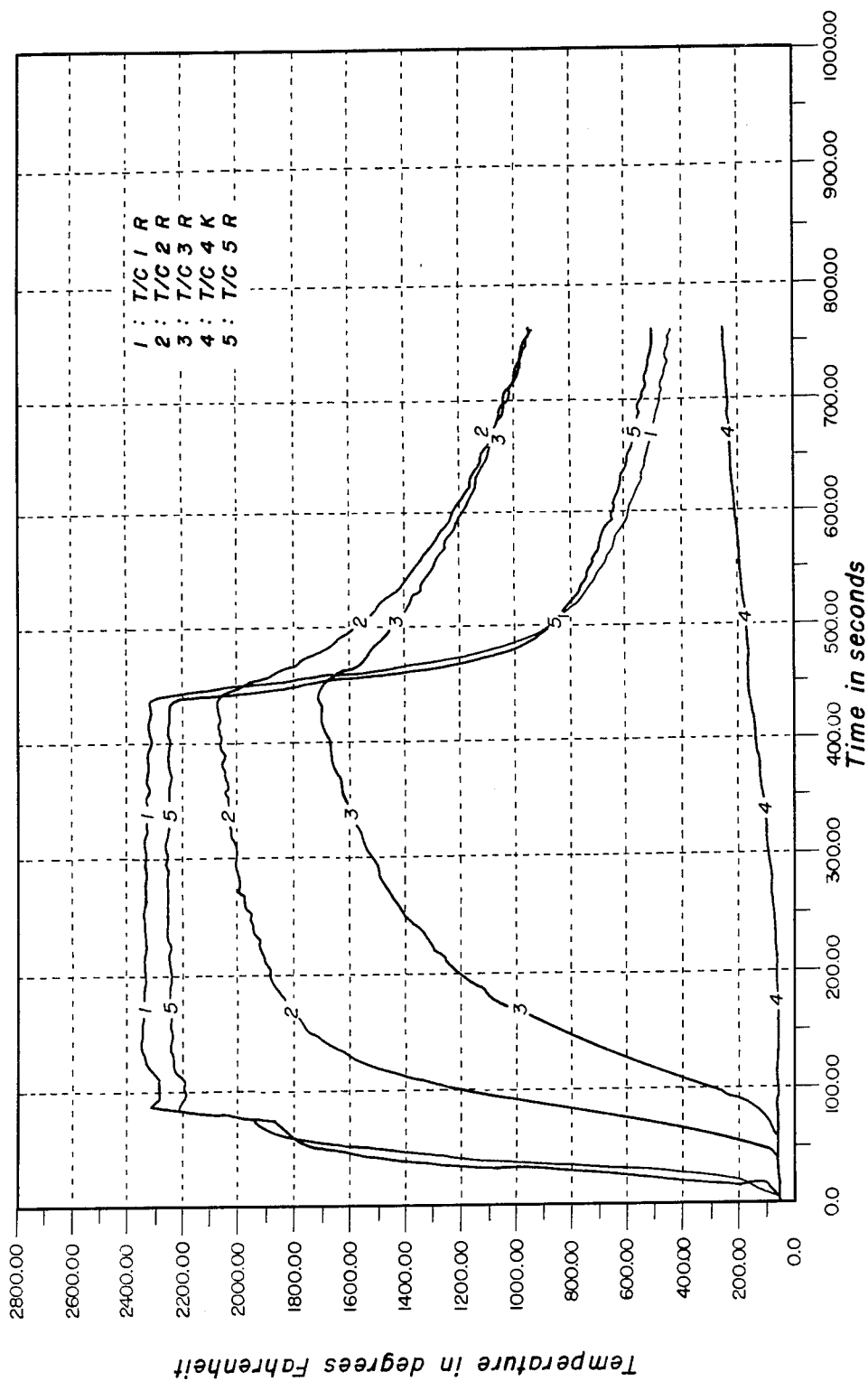
FIGURE 6 THERMAL TEST RESULTS

CERAMIC/CERAMIC SHELL TILE THERMAL PROTECTION SYSTEM AND METHOD THEREOF

ORIGIN OF THE INVENTION

The invention described herein was made by employees of the United States Government and may be manufactured and used by or for the government for governmental purposes without payment of any royalties thereon or therefor.

BACKGROUND OF THE INVENTION

1. Field of the Invention

The present invention relates to a reusable externally applied ceramic thermal protection system (TPS) for use in extremely high temperature environments such as in commercial or portable ovens or on the exterior surfaces of aerospace vehicles which are subject to high temperature (up to 3200° F.) and mechanical and thermal stresses during entry into planetary atmosphere. More particularly, the invention relates to a composite device which comprises a ceramic/ceramic upper shell which is attached to a ceramic variable density lower tile by means effective to survive the extreme thermal and stress environments to which the device is subjected. The composite device also may include one or more layers of rigid or flexible thermal insulation between the upper shell and the lower tile substrate. The upper shell effectively separates its primary function as a toughened outer load bearing skin having the proper emissivity properties, and is stress/strain independent of the lower tile.

Aerospace vehicles are subject to extremes of temperature (up to 3200° F.), pressure and stress during ascent and re-entry. It is, therefore, customary to protect the surface of the vehicles with a heat shield designed to protect the vehicle's metallic substructure. The advent of the Space Shuttle created a need for improved thermal shielding devices and equipment. A number of new materials and devices were developed. Some patents of interest are cited below.

The presently used coating on the U.S. Space Shuttle reuseable surface insulation (RSI) is a reaction cured glaze (RCG). A major disadvantage of the reaction cured glass (RCG) glaze is its low resistance to physical impact. The technical data collected to date demonstrate that even minor impacts can cause cracks and pitting of the surface coating. These minor cracks are to be avoided because it allows for moisture penetration during rain, which increases vehicle weight and results in ice formation when exposed to a space environment. The latter causes stress and premature failure of the tile. Another major problem caused by the fragility of the coating, however, is that if the coating is breached, the underlying "soft" tile may be eroded by rain or ice at relatively low speeds, i.e. less than 300 miles/hr., thus requiring replacement.

2. Related Art

The existing references in this art recognize the disadvantages of present material and configurations. Reaction cured glass as described in U.S. Pat. No. 4,093,771 is a rigid borosilicate glass material having an emissivity control agent dispersed within it. RCG requires both a physical, thermal and chemical compatibility with the substrate to minimize and avoid thermal stress failures when it is subjected to thermal extremes. When the desired compatibility is obtained, the RCG and its substrate are highly resistant to thermal stress failures and are extremely thermally stable. When the physical and chemical property match is not obtained, during use both micro and macro cracks, and spallation or peeling of the coating from the substrate can occur. It is desirable to have a system that is tougher, and doesn't require a precise match with the substrate.

The use of composite and ceramic materials for aerospace vehicle applications have been under considerable investigation over the past 30 years. Some U.S. patents of interest regarding the materials of construction and fabrication of high temperature ceramics, fibers, composites and the like include, for example:

| U.S. Pat. No. | Inventor(s) | General Subject Matter |
| --- | --- | --- |
| 3,428,519 | C. M. Zvanut | Uniformly coating fibers with boron carbide. |
| 3,603,260 | C. C. Johnson | Ablative heat shield. |
| 3,702,261 | F. Feakes, et al. | Vacuum coating of plastic or metal substrates. |
| 4,124,732 | L. L. Leger | Protection of space vehicle tiles using a strain isolation pad. |
| 4,148,962 | D. B. Leiser, et al. | Refractory composite prepared from aluminoborosilicate and silica fibers. |
| 4,226,914 | Terver, et al. | Powder composition of SiC and Si, plasma sprayed into a substrate. |
| 4,287,259 | Riley, et al. | Uniformly coating fibers with boron carbide. |

Additional U.S. patents of interest in the fabrication of compound fibers and structures include, for example: U.S. Pat. Nos. 3,709,706; 3,793,041; 3,793,041 and 4,125,406 (all of H. G. Sowman); 4,047,965 (of K. A. Karst); 4,283,376 (of S. Yajima et al.); and 4,314,827 (of M. A. Leitheiser et al.). None of these reference describe or suggest the present invention.

A patent which is incorporated herein by reference is U.S. Pat. No. 4,456,208, in which I. O. MacConochie, et al. disclose a metalic can shell structure as a thermal protection system. Both the upper shell and lower shell are metallic, usually of titanium and titanium alloys, nickel alloys, columbium or reinforced carbon composites. Although the metallic materials of construction are cited as being effective up to 2200° F. and 3000° F., the actual thermal tests disclosed for metallic structure devices have an upper temperature limit of 900° F. Stress/strain independent ceramic/ceramic upper shells or ceramic variable density lower tiles are not disclosed or suggested. Further, it is generally regarded in the art that a ceramic composite created as an upper shell of the device may be too brittle to withstand the environmental thermal and stress conditions imposed by the launch and re-entry of an aerospace vehicle. Contact between lower surface 12 of the wedge 36 in FIG. 5 of this patent reference with upper surface 36 of the lower can is encouraged to strengthen the locking of the cans and to prohibit further downward movement of the upper shell. On the contrary, in the present invention, any such extra "support" will tend to cause additional unnecessary stress to the ceramic/ceramic upper shell and cause the upper shell to fail more easily. The device described in U.S. Pat. No. 4,456,208 is constructed of thin gauge metals having thermal expansion coefficients of $10 \times 10^{-6}$ in/in °F. When exposed to large temperature gradients, this type of construction may be subject to thermal stress failure. The present invention based on its physical properties and test data is not likely to be subject to such failure. Also, metals used on the outer surface have been found to act as catalysts for re-combination of oxygen and nitrogen atoms during atmospheric reentry. The ceramic composite of the present invention is somewhat noncatalytic and therefore has certain intrinsic advantages as a heat shield component.

The present invention describes a composite device comprising a ceramic/ceramic upper shell, a ceramic lower RSI tile system and the means effective to attach them. This invention is particularly useful because it provides (a) resistance to thermal stress, (b) temperature range capability, (c) durability in that it can be used and re-used, and (d) desired lightweight characteristics.

SUMMARY OF THE INVENTION

The present invention relates to a composite ceramic device specially adapted for use as a component part of a reusable applied thermal protection system in any application where thermal containment, such as the interior of a commercial kiln, or thermal protection, such as on the external surface of an aerospace vehicle. The composite ceramic tile comprises a ceramic coated/ceramic fiber (ceramic/ceramic) upper shell, a ceramic lower (base) tile and one or more layers of flexible or rigid insulation between the upper shell and the base tile. The lower surface of the base tile is attached to a surface which is to be protected from extreme heat, such as the exterior of the aerospace vehicle.

In a preferred embodiment, the present invention relates to a ceramic composite tile device specially adapted for use as a component part of a reusable externally applied thermal protection system (TPS) on the surface of an aerospace vehicle and the like, the tile device comprising; a ceramic/ceramic upper shell and a ceramic lower base tile; the upper shell and variable density ceramic lower base tile each having a base and side portions, the ceramic/ceramic materials of the upper shell being capable of withstanding temperatures of up to 3200° F., wherein the upper shell is exposed directly to the high temperature environment during aerospace vehicle flight; the ceramic lower tile is attached to the vehicle skin and the upper shell being disposed opposite to the lower tile and attached at at least two opposite side positions of the lower tile by means effective to withstand the externally applied thermal and stress environment during use; the upper shell and lower tile together defining an interior cavity therebetween; and rigid or flexible insulating means interposed in the interior cavity for density control wherein the insulating density control means include one or more layers of high temperature rigid or flexible insulation of varying density inserted into the cavity formed.

In an additional preferred embodiment, the material of the upper shell is a ceramic/ceramic composite material, particularly alumina-boria-silica fabric coated with silicon carbide.

In yet another preferred embodiment, the attachment means effective to attach the upper shell to the lower tile include, for example, wedges at the ends of tabs extending from two opposing edges of the upper shell, tabs having circular holes with loosely fitting ceramic pins therethrough to secure the upper shell to the lower tile. Springs, spring pins, augers, rivets and the like are also useful preferred effective attachment means.

BRIEF DESCRIPTION OF THE DRAWINGS

FIG. 4 shows a side view of the combined upper shell and lower tile of FIG. 2 also showing the locations of test thermocouples.

FIG. 5 is a partial cross-sectional view of an individual assembled upper shell and lower tile showing the relative size and the location of one self locking mechanism taken along line A—A of FIG. 4.

FIG. 6 is a graphic illustration of the response of the present invention to an imposed heating environment provided by an arc-jet heated air stream of extreme temperature measured at the specific points on the composite tile of FIG. 2 as designated in FIGS. 3, 4 and 5. The temperatures are recorded by thermocouples at the positions indicated by numbers in a circle.

FIG. 7 shows a configuration of an auger useful in attaching the upper shell to the lower tile.

DETAILED DESCRIPTION OF THE INVENTION AND PREFERRED EMBODIMENTS

Figure 1:
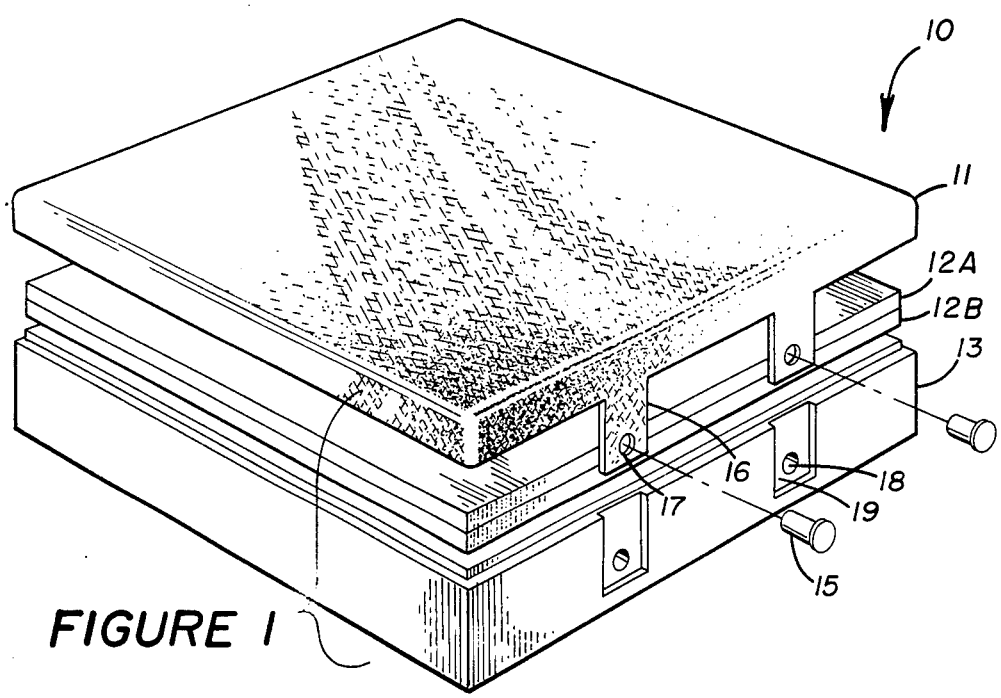
FIG. 1 is an exploded view of the components of the ceramic/ceramic upper shell tile, ceramic lower tile structure and flexible or rigid insulation therebetween prior to assembly using ceramic pins for attachment.

Now referring to the drawings, in FIG. 1 the composite thermal protection tile 10 is shown in exploded view prior to assembly. The components include the ceramic/ceramic upper shell 11, one or more layers of the same or different rigid or flexible ceramic insulation 12A and 12B and ceramic base tile 13 whose lower surface is affixed to the aluminum surface of the aerospace vehicle, usually using a flexible adhesive.

Although much of the discussion below is focused on the use of this invention in aerospace vehicle applications, the present invention is also useful in those applications wherein a lightweight flexible thermal protection system is required. The thermal protection shell insulation and tile described herein can be used, for example, as the inner surface of a commercial sized or portable kiln, oven, heater, furnace or the like.

In one embodiment, insulation 12A and 12B are layers of ceramic insulation such as 3M NEXTEL 440 Felt which will withstand temperature up to about 3000° F. and will remain mechanically flexible and durable.

In another embodiment, a multi-layer insulation may be used. The insulation shown in FIG. 1 as 12A and 12B may be flexible or rigid and may either be chemically bonded or mechanically fastened. Insulation 12A and 12B may be selected from materials such as FRCI-12, FRCI-8 and Lockheed HTP which is described for example in U.S. Pat. Nos. 3,952,083 and 4,148,962, which are incorporated herein by reference. If 12A and 12B are bonded together, a ceramic adhesive such as is known and described by NASA and is based on the RCG coating and is applied between the thermal insulation layers to be bonded at a solid concentration of about 50% by weight in water and heated to about 2200° F. to insure satisfactory adhesion between the layers.

Upper shell 11 and lower base tile 13 are connected by the fastening means of ceramic pins 15 through tabs 16 having hole 17 by insertion into cavity 18 in recess 19 of lower tile 13. Pin 15 fit snugly into cavity 18. Upper shell 11 has holes in the tabs so that the shell attaches loosely to tile 13. Other equivalent means to connect upper shell 11 and lower base tile 13 include spirals, springs, augers and the like.

Figure 2:
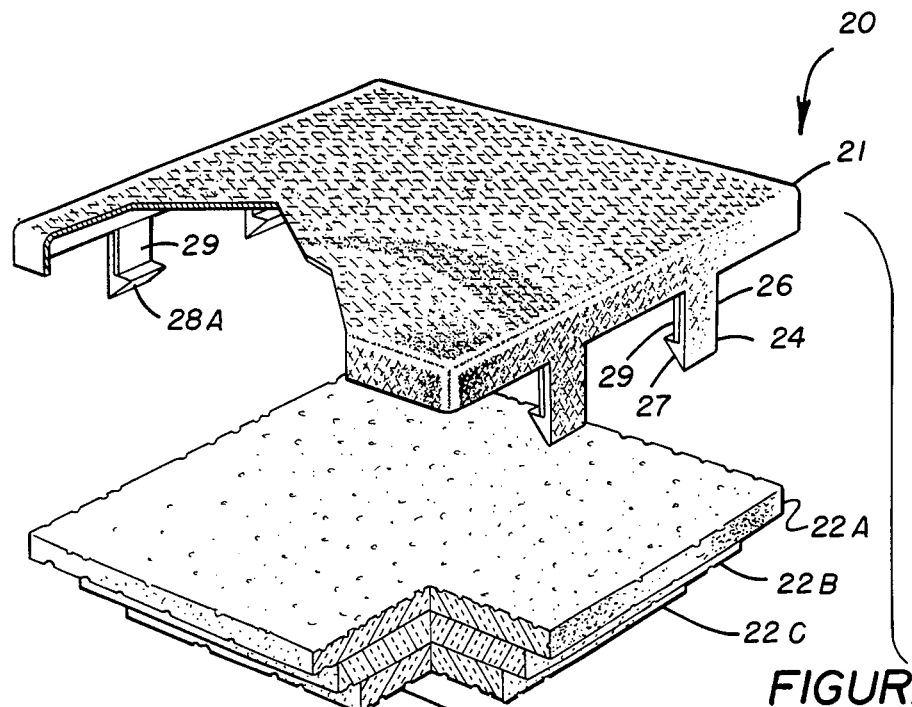
FIG. 2 is an exploded view of the components of a preferred embodiment of the ceramic/ceramic upper shell tile, ceramic lower tile and flexible or rigid insulation therebetween prior to assembly using wedges on extended tabs.

In another embodiment found in FIG. 2, the device comprising the composite thermal protection system tile 20 is shown an exploded view of the ceramic/ceramic upper shell 21; multiple layers of insulation 22A, 22B and 22C; shaped ceramic lower (base) tile 23; and a layer of flexible adhesive 23A which is used to bond the composite tile assembly to the surface protected from heat, e.g., the aluminum surface of an aerospace vehicle. Other equivalent attaching means may also be used.

Upper shell 21 and lower tile 23 when connected by self locking mechanism e.g., wedge 24/surface 25, create a cavity in which the layers of high temperature rigid or flexible insulation 22A, 22B, and 22C are placed. Insulation 22A, 22B and 22C may be of the same material as described for 12A and 12B above and may be chemically bonded together or mechanically fastened. The high temperature insulation may be selected for its thermal qualities and also for its density characteristics to obtain an assembled tile having optimum thermal and physical properties.

Upper shell 21 and lower ceramic shell tile 23 function primarily to transmit to the structure the aerodynamic loads to which the aerospace vehicle is subjected during flight. Substantially rectangular or square in shape but conforming to the shape of the vehicle, upper shell 21 and lower tile 23 are disposed opposite to one another so as to define an interior cavity between them. Upper shell 21 is slightly larger than and fits over lower tile 23 completely enclosing the interior cavity.

Because upper shell 21 is exposed to the external environment, it must be manufactured from materials which meet the thermal and structural requirements of teh aerospace vehicle. The ceramic/ceramic upper shell 21 is preferably fabricated from ceramic fabric. In a preferred embodiment, upper shell 21 is fabricated from a ceramic material, such as "3M" AB312 FABRIC XC739 [3M Co., St. Paul, Minn.] as manufactured by the Hexcel Corporation of Dublin, Calif., 94566. The composition of AB312 is 62% alumina, 24% silica and 14% boria as described in U.S. Pat. No. 3,795,514, which is incorporated herein by reference. The fabric construction, as received from the manufacturer, is 27 yarns in the warp direction per inch and 25 yarns in the fill direction per inch, having a 5 harness satin weave where the weight is about 12.3 oz/sq. yd. at a 0.026 inch thickness. A fabric based on 3M Corporation 440 fiber and silicon-carbide fiber designated "NICALON" by the Nippon Corporation of Tokyo, Japan are also useful in ceramic fabrics. The fabric is cut, preformed into the shell configuration 21 in FIG. 2, and the one ply is coated with silicon carbide using chemical vapor deposition/chemical vapor infiltration CVD/CVI processes. The CVI/CVD processes are known in the art and are described in the following references: A. J. Caputo, et al., *Ceramic Engineering and Science Proceedings*, Vol. 5, July/August 1984 pp. 654–667; D. P. Stinton, et al., "Synthesis of Fiber-Reinforced SiC Composites by Chemical Vapor Infiltration", Preprint American Ceramic Society Bulletin, February 1986; I. L. Kalnin, et al., *Electrochemical Technology*, Vol. 4, (9–10), pp. 492–497 (1966); D. P. Stinton, et al., *Ceramic Engineering and Science Proceedings*, Vol. 5, (July/August) pp. 668–676 (1984); and D. P. Stinton, et al., "Simultaneous Chemical Vapor Deposition of SiC-Dispersed Phase Composites", Proceedings of the Ninth Annual Conference on Composites and Advanced Ceramic Materials, Cocoa Beach, Fla., Jan. 20–23, 1985; which are all incorporated herein by reference. A number of companies have the capability of chemical vapor depositing ceramic materials such as silicon carbide (SiC) onto fabric. A preferred fabricator is Amercom, Inc. of Chatsworth, Calif., 91311. [See a general discussion of this technique "Ceramic Composites Based on Chemical Vapor Infiltration," by R. E. Fisher, C. V. Burkland and W. E. Bustamante at the National Institute of Ceramic Engineers meeting in San Francisco, Calif., Oct. 30, 1984, Bulletin 63(8), and also "Design of a Laboratory Size Chemical Vapor Deposition (CVD) Apparatus" by Amercom, Inc., 8928 Fulbright Avenue, Chatsworth, Calif., Final Report under Contract NAS2-11962 Revision A, for NASA-Ames Research Center, Moffett Field, Calif. 94035, both of which are incorporated herein by reference.]

A factor in the chemical vapor deposition is that the ceramic deposit on and infiltrate between the ceramic fibers. If excessive deposition occurs, a monolithic upper shell is produced which does not have the desired mechanical properties. The final weight of one silicon carbide coated fabric is 0.4 lb/ft$^2$ which translates into a silicon carbide infiltration/deposition of 0.315 lb/ft$^2$ on or into the fabric. Upper shell 21 is required to have a low thermal coefficient of expansion to prevent thermal stress failure. In the development of the ceramic/ceramic upper shell 21, a thermal shock test was performed. The shell was placed in a furnace at 2000° C. heated to 2500° C. at 35° F. per minute held for 2–3 min, removed from the furnace and allowed to cool to ambient temperature. The ceramic/ceramic shell 21 did not crack and was therefore found not to be thermal shock sensitive.

Further, the insulation 22A, 22B and 22C depending upon its composition and fabrication may be varied to achieve certain density requirements. Thus by adjustment of the composition of thermal insulation 22A, 22B or 22C, the overall weight of thermal protection system 20 may be adjusted to achieve the overall weight requirements of the thermal protection assembly and the aerospace vehicle.

In U.S. Pat. No. 4,124,732, D. R. Leiser et al. disclose a refractory composite insulating material prepared from silica and alumino-silicate fibers containing boron oxide. Small quantities of refractory opacifiers such as silicon carbide may be added. The fibrous insulation layers 22A, 22B and 22C are prepared according to this patent, which is incorporated herein by reference. Another example of the ceramic thermal insulation (22A, 22B, 22C) of the present invention which has low density and remains effective at very high temperatures is Micro Quartz ® manufactured by the Johns-Manville Aerospace Company. The 98.5+% silica fibrous insulation has a density of 3.5 lb/cu ft. and a thermal conductivity of 0.83 Btu-in/sq ft-hr-°F. at 1000° F.

The composition of ceramic tiles are known in the art. For instance, in U.S. Pat. No. 3,952,083, H. E.

Goldstein et al, disclose a reusable surface Insulation (RSI) material fabricated by sintering amorphous silica fibers at elevated temperature. The surface insulation is ordinarily manufactured in the form of blocks (i.e. tiles). The lower tile 23 may be fabricated according to this patent, which is incorporated herein by reference.

In FIGS. 4 and 5, lower tile 23 may be attached to surface 45, e.g., the exterior aluminum substructure of an aerospace vehicle or to the interior surface of a skin, using a room-temperature-vulcanizing adhesive (RTV). Adhesive 23A retains its adhesive properties up to approximately 450° F.–500° F. and may be used as the sole connecting means. Specific exemplary adhesives meeting this criteria are General Electric's RTV 560 and Hysol Company's EA-934 Epoxy.

Referring to FIGS. 1, 2, 3, 4 and 5, the means to effectively combine upper shell 21 and lower tile 23 is shown. Specifically, the self-locking mechanism is more clearly illustrated in FIG. 5. The locking tab and wedge function to hold upper shell 21 in place on lower tile 23. Basically, it utilizes a tapered wedge 24 on upper shell 21 which connects with a horizontal surface 25 on tile 23 disposed respectively on two opposite sides of the upper shell 21 and lower tile 23. Upper shell wedge 24 is disposed on the inner surface 25 of the extended sides to upper shell 21 with their tapered edge pointing downward. Lower surface 25 is disposed generally perpendicular to the vertical side of lower tile 23. Wedge 24 and surface 25 are disposed opposite to one another so as to allow upper wedge 24 to traverse over the side surface of lower tile 23 as appropriate downward pressure is applied to upper shell 21. Once upper shell wedge 24 is pushed completely beyond lower tile surface 25, upper shell 21 and lower tile 23 snap together and are locked in place, and no reverse movement will occur. This tab 26 has some flexibility as an inherent physical property, permitting expansion thereof and retraction as the wedge 24 moves downward on tile 23 to and slightly beyond surface 25.

In a preferred embodiment as shown in FIG. 5, ceramic fabric materials for the tab 26 and wedge 24 have marginal strength. Therefore, an additional layer of a fabric doubler 29 is adhered with the ceramic of the tab 26 wedge extending upward along the inside surface of tab 26. This additional fabric doubler 29 produces an effective flexibility to keep upper shell 21 in place on tile 23 during testing and during actual use conditions of composite tile 20. The doubler may be optional when the ballistic fabric weave is used.

In a preferred embodiment as shown in FIG. 5, it is important that the lower angled surface 28A of upper shell wedge 24 not contact the upper angled surface 28B of lower tile 23. Further, the space between wedge surface 28A and lower tile surface 28B should be large enough to allow for thermal expansion so that thermal stress is kept to a minimum. Usually the space between the surfaces 28A and 28B at ambient temperature is between about 0.01 and 0.05 in.

Although the number of tabs 26 and wedges 24 on the upper shell 21 may be varied, the configuration in FIG. 2 is considered to be a minimum wherein two wedges 24 are disposed at the ends of two tabs 26 and are opposed by two tabs and wedges on the opposite edge of the shell. In a preferred embodiment, a maximum of about five tabs are on each of two opposing sides. The tabs are usually placed equidistant from each other. The other two opposing sides of shell 21 do not have extending tabs or wedges. The use of only one tab and wedge on each of two opposing sides of the upper shell is anticipated to produce a rocking motion which might ultimately lead to failure of the upper shell.

FIG. 6 shows the thermal response of a typical combined thermal protection device of FIG. 2 exposed to (arc-jet) simulated high temperature conditions encountered in the re-entry of the aerospace vehicle into the earth's atmosphere. In this device 20, upper shell 21 is the "3M" AB312 Fabric XC739 manufactured by Hexcel as described above. Insulation 22A and 22B are both 3M NEXTEL 440 Felt. Lower tile 23 is composed of reusable surface insulation FRCI-12 as described in U.S. Pat. No. 4,148,962, which is incorporated herein by reference.

Figure 3:
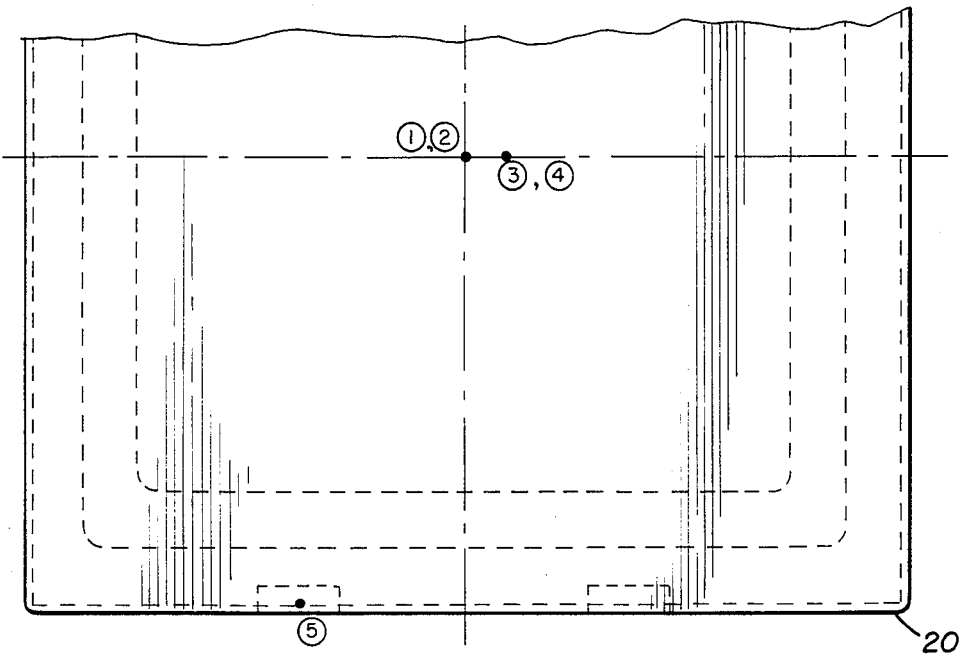
FIG. 3 shows a top view of a portion of the lower tile showing the tile and the locations of test thermocouples for the shell and tile of FIG. 2.

The curves in FIG. 6 correspond to the labelled thermocouple points marked as 1 to 5 within circles of FIGS. 3, 4 and 5, and illustrate the temperature at each point as a function of time. Therefore, curve marked 1 is a plot of temperature versus time measured by the thermocouple at point 1, curve 2 is a plot of the temperature at point 2, etc. Initially, the combined assembly 20 of FIG. 2 is subjected to steadily increasing temperatures until the top surface of upper shell 21 reaches approximately 2400° F. This temperature is then maintained for 400 sec while the thermal response of the tile is monitored. The arc-jet is turned off and the temperature decreases rapidly. These results indicate approximately a 100° F. temperature gradient through the upper shell 21 (Curve 1). The decrease in temperature through the first layer of insulation (Curves 1 and 5) is about 250° F. The decrease in temperature from the external temperature and both layers of insulation (Curve 3) is about 800° F. At no time would the aircraft substructure (aluminum) exceed a temperature of about 300° F. (Curve 4). In one test, an extra thermocouple at about point 5 just under the inner surface of upper shell 21 registered a temperature of about 2800° F. By changing the insulation layers 22A, 22B and 22C in the interior cavity between upper shell 21 and lower tile 23, the temperature profile may be altered accordingly.

In a preferred embodiment the ceramic fabric of upper shell 21 is woven in a ballistic pattern as is known in the art and supplied by Hexcel Corporation. In another preferred embodiment the ceramic fabric is woven in a triaxial pattern as is known in the art and supplied by Albany International Research Company of Dedham, Mass. 02026.

The result of a number of physical property experiments testing ballistic weave and triaxial weave ceramic fabric as upper shell 21 is shown in Table I below. The tensile tests were run according to test conditions described by ASTM No. D/682 with modification for the SiC coated samples only. The modulus of elasticity in bending measured according to ASTM No. D790 is described in Table II.

As can be seen from the data of Table I and Table II, the ballastic weave and triaxial weave fabrics (cloths) are stronger than the base line XC739 satin weave fabric. These results strongly indicate that upper shell 21 fabricated from these cloths will inherently have more strength and thus improve the impact resistance of the toughened outer skin. These improved physical properties will in no way impair the thermal properties of the ceramic/ceramic upper shell.

As can be seen from Table II, the modulus of the ballistic and triaxial weave coated fabrics are essentially the same as that for the baseline fabric, indicating that these materials should show improved impact resistance over the baseline material since the strength is enhanced without an increase in stiffness.

TABLE I
TENSILE TEST FOR SiC COATED FABRIC

| Ex. No./Sample ID | INCHES W | INCHES T | YARNS | DIRECTION FILL | DIRECTION WARP | | LBS TO BREAK ROOM TEMP | LBS TO BREAK 600 | LBS TO BREAK 1000 | LBS/YARN TO BREAK ROOM TEMP | LBS/YARN TO BREAK 600 | LBS/YARN TO BREAK 1000 | IN/IN EXT TO BREAK ROOM TEMP | IN/IN EXT TO BREAK 600 | IN/IN EXT TO BREAK 1000 | REMARKS(a)(b) |
|---|---|---|---|---|---|---|---|---|---|---|---|---|---|---|---|---|
| 1/ XC 739 FABRIC | 0.75 | .015 | 19 | X | | MAX. MIN. AVG. | 179 139 153 | 147 140 144 | 112 108 110 | 9.4 7.3 8.0 | 7.7 7.4 7.6 | 5.9 5.7 5.8 | 0.020 0.016 0.018 | 0.017 0.017 0.017 | 0.020 0.020 0.020 | Base Line |
| 2/ XC 739 FABRIC | 0.75 | .015 | 19 | | X | MAX. MIN. AVG. | 152 112 136 | 140 132 137 | 117 104 111 | 8.0 5.9 7.2 | 7.4 6.9 7.2 | 6.2 5.5 5.8 | 0.018 0.016 0.017 | 0.018 0.015 0.016 | 0.020 0.020 0.020 | Base Line |
| 3/ XC 739 FABRIC/SiC | 0.75 | .040 | 19 | X | | MAX. MIN. AVG. | 192 116 161 | 207 167 179 | 164 162 163 | 10.1 6.1 8.5 | 10.9 8.8 9.4 | 8.6 8.6 8.6 | 0.006 0.005 0.005 | 0.006 0.006 0.006 | 0.008 0.008 | Composite 0.40 lbs/ft² |
| 4/ XC 739 FABRIC/SiC | 0.75 | .040 | 19 | | X | MAX. MIN. AVG. | 161 92 138 | 188 172 178 | 146 141 144 | 8.5 4.8 7.3 | 9.9 9.1 9.4 | 7.7 7.4 7.6 | 0.009 0.005 0.006 | 0.008 0.006 0.007 | 0.010 0.007 0.008 | Composite 0.40 lbs/ft² |
| 5/ BLACK AB312 FABRIC | 0.75 | .012 | 13 | X | | MAX. MIN. AVG. | 102 91 98 | 77 56 67 | 47 47 47 | 7.8 7.0 7.5 | 5.9 4.3 5.2 | 3.6 3.6 3.6 | 0.014 0.012 0.013 | 0.014 0.013 0.013 | 0.018 0.018 0.018 | |
| 6/ BLACK AB312 FABRIC | 0.75 | .012 | 15 | | X | MAX. MIN. AVG. | 125 112 117 | 93 78 86 | 53 52 53 | 8.3 7.5 7.8 | 6.2 5.2 5.7 | 3.5 3.5 3.5 | 0.018 0.018 0.018 | 0.018 0.016 0.017 | 0.020 0.020 0.020 | |
| 7/ BLACK AB312 FABRIC/SiC | 0.75 | .035 | 13 | X | | MAX. MIN. AVG. | 138 125 134 | 142 125 137 | 79 77 78 | 10.6 9.6 10.3 | 11.2 9.6 10.5 | 6.1 5.9 6.0 | 0.008 0.004 0.005 | 0.007 0.006 0.006 | 0.006 0.006 0.006 | Composite 0.34 lbs/ft² |
| 8/ BLACK AB312 FABRIC/SiC | 0.75 | .035 | 15 | | X | MAX. MIN. AVG. | 157 126 139 | 129 126 128 | 83 61 72 | 10.5 8.4 9.3 | 8.6 8.4 8.5 | 5.5 4.1 4.8 | 0.004 0.003 0.004 | 0.006 0.006 0.006 | 0.006 0.006 0.006 | Composite 0.34 lbs/ft² |
| 9/ XC 865 BALLISTIC FABRIC | 0.75 | .025 | 10 | X | | MAX. MIN. AVG. | 316 132 225 | 178 160 168 | 157 148 152 | 31.6 13.2 22.5 | 17.8 16.0 16.8 | 15.7 14.8 15.2 | 0.022 0.019 0.020 | 0.018 0.016 0.017 | 0.020 0.018 0.019 | |
| 10/ XC 865 BALLISTIC FABRIC | 0.75 | 0.25 | 10 | | X | MAX. MIN. AVG. | 316 103 241 | 213 183 194 | 147 145 146 | 31.6 10.3 24.1 | 21.3 18.3 19.4 | 14.7 14.5 14.6 | 0.020 0.017 0.019 | 0.018 0.017 0.017 | 0.020 0.020 0.020 | |
| 11/ XC 865 BALLISTIC FABRIC/SiC | 0.75 | .045 | 10 | X | | MAX. MIN. AVG. | 285 209 245 | 311 193 259 | 272 204 238 | 28.5 20.9 24.5 | 31.1 19.3 25.9 | 27.2 20.4 23.8 | 0.007 0.005 0.006 | 0.013 0.007 0.009 | 0.011 0.010 0.010 | Composite 0.35 lbs/ft² |
| 12/ | 0.75 | .045 | 10 | | X | MAX. | 305 | 305 | 241 | 30.5 | 30.5 | 24.1 | 0.008 | 0.009 | 0.013 | Composite |

TABLE I-continued

| Ex. No./Sample ID | INCHES W | INCHES T | YARNS | DIRECTION FILL | DIRECTION WARP | | TENSILE TEST FOR SiC COATED FABRIC | | | | | | | | | | REMARKS[a][b] |
|---|---|---|---|---|---|---|---|---|---|---|---|---|---|---|---|---|---|
| | | | | | | | LBS TO BREAK | | | LBS/YARN TO BREAK | | | IN/IN EXT TO BREAK | | | | |
| | | | | | | | ROOM TEMP | 600 | 1000 | ROOM TEMP | 600 | 1000 | ROOM TEMP | 600 | 1000 | | |
| XC 865 BALLISTIC FABRIC/SiC | | | | | | MIN. AVG. | 208 265 | 152 249 | 218 230 | 20.8 26.5 | 15.2 24.9 | 21.8 23.0 | 0.007 0.008 | 0.007 0.008 | 0.010 0.010 | 0.35 lbs/ft² |
| 13/ AB 312 TRIAXIS FABRIC | 0.75 | .025 | 9 | 60 Deg. | | MAX. MIN. AVG. | 134 114 127 | 100 94 98 | 81 81 81 | 14.9 12.7 14.1 | 11.1 10.4 10.8 | 9.0 9.0 9.0 | 0.012 0.010 0.011 | 0.017 0.013 0.015 | 0.018 0.016 0.017 | |
| 14/ AB 312 TRIAXIS FABRIC | 0.75 | .025 | 6 | | 90 Deg. | MAX. MIN. AVG. | 102 85 91 | 86 66 77 | 55 55 55 | 17 14.2 15.2 | 14 11 12.8 | 9.2 9.2 9.2 | 0.011 0.010 0.010 | 0.011 0.011 0.011 | 0.017 0.014 0.015 | |
| 15/ AB 312 TRIAXIS FABRIC/SiC | 0.75 | .035 | 9 | 60 Deg. | | MAX. MIN. AVG. | 270 176 237 | 231 184 234 | 193 154 165 | 30.0 19.6 | 25.7 20.4 26.0 | 21.4 17.1 18.3 | 0.008 0.005 0.006 | 0.008 0.007 0.007 | 0.009 0.004 0.005 | Composite 0.32 lbs/ft² |
| 16/ AB 312 TRIAXIS FABRIC/SiC | 0.75 | .035 | 5 | | 90 Deg. | MAX. MIN. AVG. | 210 142 180 | 232 179 202 | 164 104 130 | 42 28.4 36.0 | 46.4 35.8 40.4 | 32.8 20.8 26.0 | 0.007 0.004 0.005 | 0.010 0.007 0.008 | 0.007 0.004 0.006 | Composite 0.32 lbs/ft² |

[a] All temperatures in degrees Centigrade
[b] All composites are reported as aerial density.

TABLE II

MODULUS OF ELASTICITY IN BENDING[a]

| EX. NO. | SAMPLE ID | SPAN L (in) | WIDTH b (in) | DEPTH d (in) | SLOPE m (lbs/in) | $E_B$ (Bending Modulus)[b] (psi) | REMARKS |
| --- | --- | --- | --- | --- | --- | --- | --- |
| 17 | XC 739 | 2 | .5 | 0.035 | 100 | $9.3 \times 10^{+6}$ | WARP |
| 18 | XC 739 | 2 | .5 | 0.035 | 90 | $8.4 \times 10^{+6}$ | FILL |
| 19 | XC 865 BALLISTIC | 2 | .5 | 0.035 | 90 | $8.4 \times 10^{+6}$ | WARP |
| 20 | XC 865 BALLISTIC | 2 | .5 | 0.035 | 86 | $8.0 \times 10^{+6}$ | FILL |
| 21 | AB 312 TRIAXIS | 2 | .5 | 0.035 | 38.3 | $3.6 \times 10^{+6}$ | 60 Deg. |
| 22 | AB 312 TRIAXIS | 2 | .5 | 0.035 | 81.2 | $7.6 \times 10^{+6}$ | 90 Deg. |
| 23 | AB 312 BLACK | 2 | .5 | 0.035 | 52 | $4.8 \times 10^{+6}$ | WARP |
| 24 | AB 312 BLACK | 2 | .5 | 0.035 | 44 | $4.1 \times 10^{+6}$ | FILL |

[a] ASTM Test No. D790

[b] $E_B = \dfrac{L^3 m}{4bd^3}$ (in psi)

While only a few embodiments of the present invention have been shown and described herein, it will be apparent to those skilled in the art that various modifications and changes can be made in the construction of a thermal protection tile and composite system for aerospace applications without departing from the spirit and scope of the present invention. All such modifications coming within the scope of the appended claims are intended to be covered thereby.

We claim:

1. A ceramic composite tile device specially adapted for use as a component of a reusable thermal protection system for use on the surface of an object in need of thermal protection, which device comprises:

(a) a ceramic-coated ceramic-fabric upper shell itself comprising a woven ceramic fabric in the shape of an upper shell wherein the upper shell is coated with additional ceramic by chemical vapor deposition and chemical vapor infiltration;

(b) ceramic lower base tile, wherein the upper shell and lower base tile are stress/strain independent; and, (c) one or more layers of flexible or rigid ceramic insulation interposed in the interior cavity formed by the attachment of component (a) to component (b).

2. The ceramic composite tile device of claim 1 wherein the ceramic-coated ceramic-fabric upper shell is attached to the cast ceramic lower base tile by two or more extended tab means on opposing sides effective to withstand the thermal and mechanical stresses during use.

3. The ceramic composite tile device of claim 2 wherein the object in need of thermal protection is an oven.

4. The ceramic composite tile device of claim 2 wherein the object in need of thermal protection is a furnace.

5. The ceramic composite tile device of claim 2 wherein the object in need of thermal protection is an aerospace vehicle.

6. A ceramic composite tile device specially adapted for use as a component part of a reusable externally applied thermal protection system on the surface of an aerospace vehicle, which device comprises:

a ceramic-coated ceramic-fabric upper shell itself comprising a woven ceramic fabric in the shape of an upper shell wherein the upper shell is coated with additional ceramic by chemical vapor deposition and chemical vapor infiltration, a ceramic lower base tile, and thermal insulating means;

the upper shell and lower base tile each having a base and opposite side portions;

the upper shell being constructed of ceramic-coated ceramic-fabric materials being able to withstand temperatures of up to about 3200° F., wherein the upper shell is exposed directly to the high temperature environment during aerospace vehicle flight, wherein the upper shell having edge extended attachment means is attached to:

the ceramic lower base tile being adapted to be attached to the surface of the vehicle and the upper shell being disposed opposite to the lower shell tile and attached at at least two positions on each of two opposite edge side positions of the ceramic lower base tile by attachment means effective to withstand the externally applied thermal and stress environment during use, the upper shell and lower base tile interlocking together and defining an interior cavity therebetween, wherein the upper shell and lower base tile are stress/strain independent; and insulating means interposed in the interior cavity, and the insulation means including at least one layer of high temperature insulation within said cavity for control of the overall density of the composite tile device.

7. The ceramic composite tile device of claim 6 wherein in the upper shell the fabric comprises a mixture of alumina-silica-boria.

8. The ceramic composite tile device of claim 7 wherein upon the ceramic fabric of the upper shell silicon carbide has been deposited.

9. The ceramic composite tile device of claim 7 wherein the effective means to combine the upper shell and the lower tile comprises at least two tabs extending from each of two opposite side portions of the upper shell, said tabs having circular openings with corresponding openings in the edge of the lower shell tile wherein snugly fitting ceramic pins are placed therein.

10. The ceramic composite tile device of claim 9 wherein in the ceramic-coated ceramic-fabric upper shall, the effective locking means comprise circular holes in the tabs of the upper shell which attach securely to shaped cylindrical pegs machined into the side edge of the ceramic lower tile.

11. The ceramic composite tile device of claim 6 wherein the effective means to attach the upper shell and the lower base tiles comprises wedges on at least two extended tabs located on each of two opposite sides of the upper shell and an compatible interlocking opposed surface on the lower tile.

12. The ceramic composite tile device of claim 11 wherein the fabric of the upper shell tile is woven in a triaxial pattern.

13. The ceramic composite tile device of claim 11 wherein in the upper shell the extended tab further includes a fabric doubler to provide effective flexibility to lock the upper shell to the lower tile.

14. The ceramic composite tile device of claim 6 wherein the upper shell fabric is woven in a ballistics pattern.

15. As an article of manufacture, a ceramic-coated ceramic-fabric upper shell as a component for use in a ceramic, reusable, externally applied thermal protection device on the surface of an aerospace vehicle, which upper shell comprises:

a base and side portions, constructed of ceramic materials itself comprising a woven ceramic fabric in the shape of an upper shell wherein the upper shell is coated with additional ceramic by chemical vapor deposition and chemical vapor infiltration, able to withstand temperatures up to about 3200° F. having at least two extended tabs on each of two opposing sides of the upper shell comprising interlocking means to effectively secure the upper shell to a complementary ceramic lower base tile wherein the upper shell and lower base tile are stress/strain independent.

16. The ceramic-coated ceramic fabric upper shell of claim 15 wherein the upper shell is comprised of ceramic material.

17. The ceramic-coated ceramic-fabric upper shell of claim 16 wherein the upper shell is comprised of a woven fabric itself comprised of a mixture of alumina-silica-boria.

18. The ceramic-coated ceramic-fabric upper shell of claim 17 wherein the shell is further comprised of a deposited coating of silicon carbide.

19. The ceramic-coated ceramic fabric upper shell of claim 15 wherein the effective means to secure the upper shell to the lower tile consist essentially of interlocking opposed wedges at the ends of the extended tabs.

20. In a composite ceramic thermal protection device for use on the exterior surface of an aircraft or spacecraft, wherein the improvement is the use of a thermally stable rigid protective ceramic-coated ceramic-fabric upper shell itself comprising a woven ceramic fabric in the shape of an upper shell wherein the upper shell is coated with additional ceramic by chemical vapor deposition and chemical vapor infiltration, attached to a complimentary ceramic lower base, tile wherein the upper shell and the lower base tile are stress/strain independent and do not comprise the same ceramic materials and the upper shell is attached securely to the lower base tile by interlocking means effective to survive temperatures up to 3200° F.

21. The composite ceramic protection device of claim 20 wherein the ceramic coated ceramic-fabric material of the upper shell is a woven fabric comprising silica-alumina boria upon which is deposited a silicon carbide coating.

22. The composite ceramic protection device of claim 21 wherein the effective locking means are two or more opposed wedges at the ends of extended tabs on each of two opposite sides of the upper shell.

* * * * *